(No Model.)
J. P. BRADFORD.
CULTIVATOR TOOTH.
No. 292,404. Patented Jan. 22, 1884.
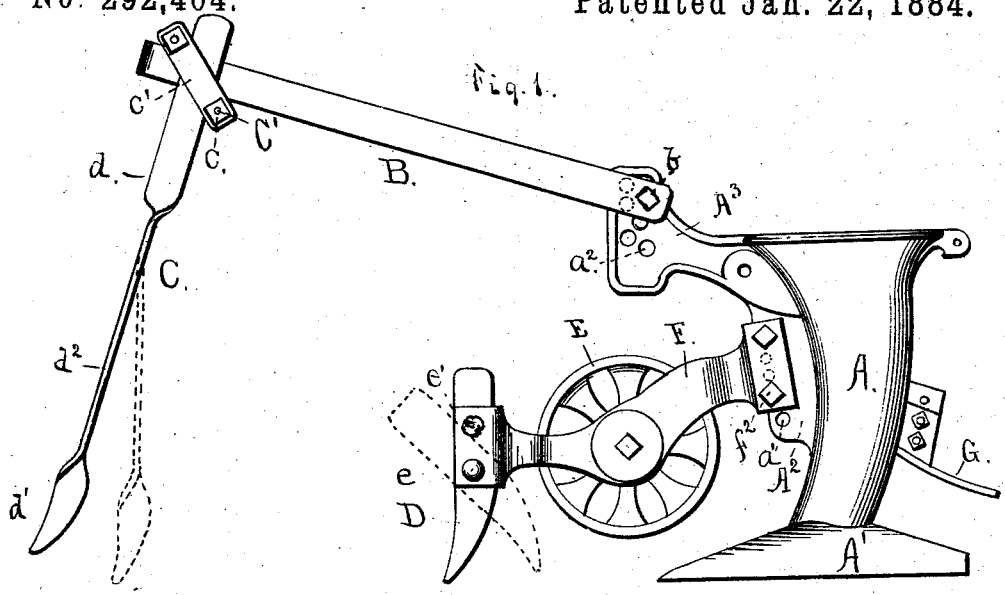
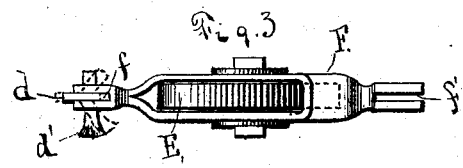
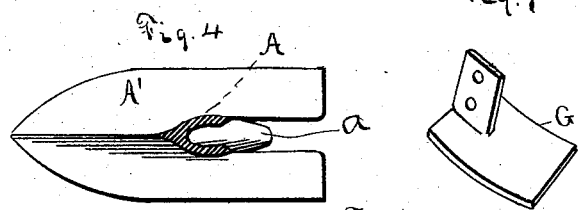
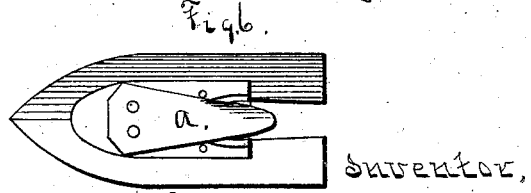
Witnesses,
N. A. Clark,
P. B. Impin,
Inventor,
Joseph P. Bradford
By R. S. & A. P. Lacey
Attys

UNITED STATES PATENT OFFICE.

JOSEPH P. BRADFORD, OF WESTON, MICHIGAN, ASSIGNOR OF ONE-HALF TO ANDREW J. WALTERS, OF SAME PLACE.

CULTIVATOR-TOOTH.

SPECIFICATION forming part of Letters Patent No. 292,404, dated January 22, 1884.

Application filed July 9, 1883. (No model.)

*To all whom it may concern:*

Be it known that I, JOSEPH P. BRADFORD, a citizen of the United States, residing at Weston, in the county of Lenawee and State of Michigan, have invented certain new and useful Improvements in Drill and Cultivator Teeth; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in drill and cultivator teeth; and it consists in the construction, combination, and arrangement of the several parts, as will be hereinafter described and claimed.

In the drawings, Figure 1 is a side view of my improved drill-tooth, with gage-wheel, colter, &c. Fig. 2 is a detail of the bars supporting the spring-colter. Fig. 3 is a plan view of the gage-wheel bracket. Figs. 4, 5, and 6 are detail views of the drill-foot, and Fig. 7 is a detail perspective of the rear gage-plate.

The drill-tooth A is provided with the foot A', preferably made in the flat form shown, and the forward edge of the tooth, just above the foot, is made very sharp, so as to present but little resistance to the ground. On the under side of the foot A', at the base of the tooth-opening, I arrange a spreader-plate, $a$, on which the grain being planted drops. The sides of this spreader-plate are cut away to give the tapered form shown. The object of this is to give a more even distribution to the grain. The grain thrown laterally from the forward and wider end drops to the outer sides of the furrow, while the narrow portions of the plate permit the grain to drop nearer the middle of said furrow. By this construction the grain is left evenly distributed over the bottom of the furrow. This plate is rounded on its upper side, and causes the grain to scatter to the opposite sides, preventing it from all dropping into the same spot. A rib or flange, $A^2$, is projected from the drill-tooth. This flange is provided with a series of holes, $a'\ a'$, for the purpose hereinafter described.

A coupling ear or bracket, $A^3$, is projected forward from the upper end of the tooth A, and provided with a series of holes, $a^2\ a^2$.

The bar B is bent at its forward end, providing the strips or bars B', which are braced apart midway their ends by the block $B^2$, and their rear ends extend on opposite sides of the ear $A^3$, and are secured thereto by the bolt $b$, which is passed through suitable holes formed in the said bars B' and any one of the holes $a^2$, as may be desired.

The colter C is secured on the bar B by the clip C', which passes around one of the strips of said bar, and by means of nuts $c$ and clip-plate $c'$ clamps the colter firmly to the bar B, along which it may be readily adjusted, as desired. This colter C is composed of a spring metal strip forged to provide the portions $d\ d'$, arranged edgewise to the line of motion, and the intermediate portion, $d^2$, arranged at right angles to portions $d\ d'$, as shown. This portion $d^2$ is the one that acts or serves as a spring to give elasticity to the colter in the operation of the device. The portion $d'$ is formed in suitable manner to cut the turf and soil in advance of the gage-wheel and supplemental colter, hereinafter described.

The colter D and gage-wheel E are supported on the bracket F. This bracket F may be made of a single piece, as shown, or may be constructed of two side plates suitably clamped together. It is constructed with slots $f\ f'$ in its forward and rear ends. The slot $f'$ fits over the rib $A^2$ on front of tooth A, and is fastened thereto by means of bolts $f^2\ f^2$, which may be passed through the upper or lower holes of the series $a'$, in order to adjust the gage-wheel to different heights. The bracket extends forward from the tooth A, and the gage-wheel E is journaled therein about midway its ends. The colter D is pivoted on bolt $e$, passed through the bracket F, at or near the lower end of the slot $f$, and its upper end is retained within said slot by the pin $e'$, made of wood or other fragile material, and the colter D is held within the slot $f$ by this pin $e'$ and bolt $e$ in such manner that when the said colter strikes a stone or other obstruction in the ground the force of the stroke will break the pin $e'$ and the colter will turn back on its pivot-bolt $e$, as indicated in dotted lines, Fig. 1, and slide over the obstruction, as will be readily understood.

The point $d'$ of colter C, it will be seen, is slightly above the lower point of colter D, and the latter colter cuts to about the lower side of the tooth A', so that the soil to the full depth of the tooth is opened by degrees, lessening the draft of the machine as well as the strain on the tooth. By setting the wheel E up or down by means of the adjustment of the bracket before described, the depth of the tooth can be regulated.

A gage-plate, G, is secured to the rear side of the tooth A, and may be adjusted up or down to regulate the depth of the said tooth. This plate G may be used as a substitute for the gage-wheel E or in connection therewith. I prefer to use it in the latter way, as thereby the tooth is braced in front and in rear, and held more firmly in position than when braced on one side only.

Having thus described my invention, what I claim, and desire to secure by Letters Patent, is—

1. The combination, substantially as hereinbefore described, of the tooth having a rib, $A^2$, projected forward therefrom and perforated with a series of holes, $a$, the bracket having its rear end provided with slot $f'$, slipped over the rib $A^2$, and suitable fastening-bolts, the said bracket having a suitable colter secured to its forward end, and a gage-wheel journaled in rear of said colter, as and for the purposes set forth.

2. The combination, with the tooth A and gage-wheel E, arranged in advance of and supported on bracket F, projected forward from said tooth, of a gage or depth-regulating device arranged and operating in rear of the tooth, substantially as and for the purposes set forth.

3. The combination of the tooth, the bracket projected forward therefrom in approximately a horizontal position, and provided with a suitable gage-wheel midway its ends, and the colter D, pivotally secured to the bracket by bolt $e$, and held to the bracket above said pivot by a fragile pin, $e'$, all arranged and operating substantially as and for the purposes set forth.

4. The combination, substantially as hereinbefore described, of the tooth A, having forward rib or flange, $A^2$, the bracket F, having colter D and wheel E, the bar B, extended forward from said tooth, and the spring-colter C, held adjustably to the bar B, with the lower end of its point $d'$ working in a plane above the point of colter D, as and for the purposes specified.

5. The combination, substantially as hereinbefore described and shown, of the drill-tooth, the spreader-plate arranged within and at the base of same, the bracket F, removably secured to and projected forward from the tooth, the colter D, and gage-wheel E, supported on said bracket, and the coverer and gage-plate G, arranged in rear of the tooth, as and for the purposes specified.

In testimony whereof I affix my signature in presence of two witnesses.

JOSEPH P. BRADFORD.

Witnesses:
A. J. WALTERS,
SARAH SOUTHWORTH.